Feb. 26, 1924.
C. H. VEEDER
VISOR FOR AUTOMOBILES
Filed March 5, 1923
1,484,687
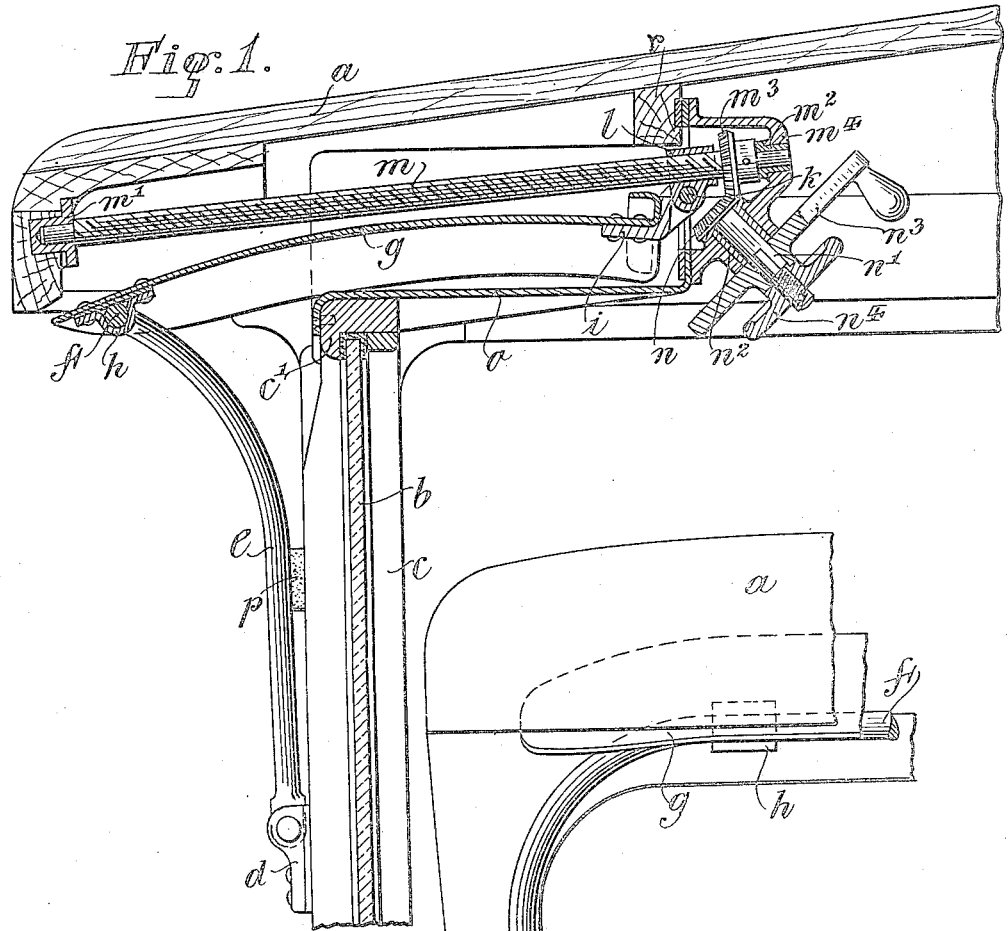
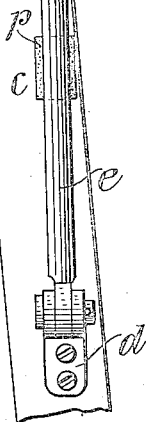
INVENTOR
Curtis Hussey Veeder
BY Redding, Greeley, O'Shea & Campbell
ATTORNEYS Patented Feb. 26, 1924.

1,484,687

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

VISOR FOR AUTOMOBILES.

Application filed March 5, 1923. Serial No. 622,714.

*To all whom it may concern:*

Be it known that I, CURTIS HUSSEY VEEDER, a citizen of the United States, residing in Hartford, in the State of Connecticut, have invented certain new and useful Improvements in Visors for Automobiles, of which the following is a specification, reference being had to the accompanying drawing, forming a part hereof.

This invention has for its object to provide an improved adjustable visor for application to a fixed top of an automobile or other vehicle. In accordance with the invention the visor proper or light shade is hinged or pivoted at its forward edge upon the supporting bail or arms which are pivotally mounted on the windshield frame and is supported at its rear edge by a traveling nut which engages the operating screw. The visor or light shade has thus a three-point support which assures ease and readiness of operation without binding. The straight line motion at the center of the rear edge has the effect of increasing the radius of motion of the visor, the motion being the equivalent of that which a rigid visor would have if mounted to swing upon an axis some distance to the rear of the windshield support. The hinging or pivoting of the visor at its forward edge, upon its pivoted supporting arms, makes it possible to secure the desired protection for the eyes which could be secured with a visor rigidly mounted upon its supporting arms by giving the visor a curvature which would require too much space under the automobile top. Furthermore the supporting of the visor in the manner described and its operation as described, make it possible to dispense with the fixed guide grooves which have been provided heretofore for visors fixed to the supporting arms. There is therefore neither the binding nor the rattling incident to the use of such guideways and at the same time the visor is held either in its extreme rearward position or in any position of operation without liability to rattling. The device as a whole is simple in construction, easy of operation and readily installed. The invention will be more fully explained with reference to the accompanying drawing in which it is illustrated and in which—

Figure 1 is a view in longitudinal section of so much of an automobile top and of the improved visor construction as is necessary to permit the application and operation of the visor to be understood.

Figure 2 is a partial view of the same in front elevation.

In the embodiment and application of the invention illustrated in the drawing, a portion of an automobile top of ordinary construction is indicated at $a$, with a windshield at $b$ and a windshield frame at $c$, the windshield and windshield frame or support being also of any usual or suitable construction. To the windshield frame or support $c$, at each side thereof, is pivotally connected, as by a suitable bracket $d$, a visor supporting arm $e$. Preferably two arms, only one of which is shown, are connected by an integral cross bar $f$, thus forming a bail which is pivotally mounted on the windshield frame to swing freely. The visor proper or light shade $g$ is pivoted or hinged at its forward edge upon the supporting arms $e$. As shown it is provided at its forward edge with bearing clips, one of which is shown at $h$, which engage the cross bar $f$ of the bail in such manner as to permit the visor to swing freely with respect to the pivoted supporting arms $e$. The visor itself may be constructed of any suitable material, rigid or semi-rigid, so that in operation it will retain its slightly curved form. At its rear edge the visor is provided with a clip or bar $i$ which has pivotal engagement at $k$ with a traveling nut $l$. The latter is engaged by an operating screw $m$ which is mounted in suitable bearings $m'$ and $m^2$, supported by the top $a$, and is provided with a beveled gear $m^3$ which is engaged by a beveled gear $n$ on the operating shaft $n'$. The latter is mounted in a bearing $n^2$, supported by the bracket which supports the bearing $m^2$, and is provided with an operating handle $n^3$ and screw clamp nut $n^4$, which serves to retain the shaft $n'$ and the gear $n$ and therefore the operating screw $m$ in desired position. To prevent the driving in of cold air or moisture under the visor $g$, there may be provided a liner $o$, secured at its forward edge to the top cross bar $c'$ of the windshield frame and at its rear edge to the cross bar $n$ of the top. Buffers $p$ may be provided to furnish bearings for the arms $e$ when the visor is in its extreme retracted position.

In the operation of the visor, as will be understood, the screw clamp $n^4$ having been loosened, the crank handle $n^3$ is actuated to rotate the operating screw $m$, by which the nut $l$ is made to travel forward, causing the visor $g$ to be moved into more or less extended position, the visor proper swinging upon its pivotal or hinged support at the upper ends of the arms $e$ while the arms themselves swing upon their supporting brackets $d$.

It will be understood that various changes in details of construction and arrangement can be made to suit different conditions of use, and that the invention, except as pointed out in the accompanying claims, is not limited to the particular construction shown and described herein.

I claim as my invention:

1. In a visor for automobiles, etc., the combination with an automobile top, a liner forming a pocket under the top, pivoted supporting arms, and a light shade pivotally mounted at its forward edge upon the supporting arms and arranged to move in said pocket, of means to support movably the rear edge of the light shade, such means comprising a centrally disposed operating screw mounted in bearings under the top and a traveling nut engaged therewith and pivotally connected to the light shade at its rear edge.

2. In a visor for automobiles, etc., the combination with an automobile top, a liner forming a pocket under the top, pivoted supporting arms, and a light shade pivotally mounted at its forward edge upon the supporting arms and arranged to move in said pocket, of means to support movably the rear edge of the light shade, such means comprising a centrally disposed operating screw mounted in bearings under the top and a traveling nut engaged therewith and pivotally connected to the light shade at its rear edge, and means for actuating the operating screw.

3. In a visor for automobiles, etc., the combination with an automobile top, a liner forming a pocket under the top, pivoted supporting arms, and a light shade pivotally mounted at its forward edge upon the supporting arms and arranged to move in said pocket, of means to support movably the rear edge of the light shade, such means comprising a centrally disposed operating screw mounted in bearings under the top and a traveling nut engaged therewith and pivotally connected to the light shade at its rear edge, means for actuating the operating screw, and means for clamping the actuating means in determined position.

This specification signed this 2 day of March, A. D. 1923.

CURTIS HUSSEY VEEDER.